United States Patent [19]

Ishikawa

[11] Patent Number: 5,104,242

[45] Date of Patent: Apr. 14, 1992

[54] FIBER OPTIC CONNECTOR

[75] Inventor: Masatake Ishikawa, Osaka, Japan

[73] Assignee: Nippon Sheet Glass Co., Ltd., Osaka, Japan

[21] Appl. No.: 599,703

[22] Filed: Oct. 18, 1990

[30] Foreign Application Priority Data

Oct. 19, 1989 [JP] Japan .................................. 1-272133

[51] Int. Cl.⁵ ............................ G02B 6/36; G02B 6/00
[52] U.S. Cl. ......................................... 385/53; 385/73
[58] Field of Search ........................... 350/96.20–96.22

[56] References Cited

U.S. PATENT DOCUMENTS

| | | | |
|---|---|---|---|
| 4,362,360 | 12/1982 | Mannschke | 350/96.20 |
| 4,585,302 | 4/1986 | Schoen | 350/96.20 |
| 4,674,833 | 6/1987 | Des Forges et al. | 350/96.20 X |
| 4,805,978 | 2/1989 | Bruch et al. | 350/96.20 |
| 4,848,866 | 7/1989 | Feulner et al. | 350/96.20 |

*Primary Examiner*—Akm Ullah
*Attorney, Agent, or Firm*—Irving M. Weiner; Joseph P. Carrier; Pamela S. Burt

[57] ABSTRACT

A fiber optic connector includes a plug having a ferrule adapted to be connected to a tip end of an optical fiber, a receptacle associated with a light-emitting element and having a ferrule insertion hole defined therein for receiving the plug therein, the ferrule insertion hole being held in light-transmitting communication with the light-emitting element, the receptacle being arranged such that the receptacle establishes an optical path between the light-emitting element and the optical fiber for optical coupling therebetween when the ferrule is inserted into the ferrule insertion hole, and a light blocking element for interrupting the optical path within the ferrule insertion hole in response to insertion of the ferrule into the ferrule insertion hole. The light blocking element comprises a resilient member such as a leaf spring disposed in the ferrule insertion hole and resiliently displaceable into an inner circumferential surface of the ferrule insertion hole when pressed by the ferrule, thereby allowing the ferrule to be inserted into the ferrule insertion hole.

12 Claims, 2 Drawing Sheets

FIBER OPTIC CONNECTOR

BACKGROUND OF THE INVENTION

1. Field of the Invention

The present invention relates to a fiber optic connector which comprises a socket or receptacle to be coupled to a transmitter including a light source, and a plug to be coupled to a receiver through an optical transmission medium such as an optical fiber. The plug is connectable to or insertable into the receptacle to establish an optical path for transmission of a light beam such as a laser beam from the transmitter to the receiver.

2. Description of the Relevant Art

There are known fiber optic connectors which comprise a transmitter socket or receptacle and a receiver plug connected to or inserted in the receptacle to establish an optical path from the transmitter to the receiver. The conventional fiber optic connectors, however, have no provision for blocking or preventing a light beam from being emitted out of the receptacle when the plug is removed from the receptacle during transmission of optical data from the transmitter to the receiver through the connectors. Therefore, the light beam may enter an operator's eye upon removal of the plug from the receptacle while the fiber optic data link is in use. If a high-output laser beam or concentrated laser beam is transmitted through the fiber optic connector, then the operator's eye may get hurt or injured.

One solution is to use protective glasses which are worn by the operator. However, it is awkward for some operators to wear protective glasses. Another problem is that since protective glasses are generally shaded, they make things look darker and less recognizable. Also if a semiconductor laser or the like which emits a light beam outside of the visible spectrum is employed, then the operator often tends to forget to wear protective glasses, letting the light beam directly enter his eyes due to oversight when the plug is separated from the receptacle.

SUMMARY OF THE INVENTION

In view of the aforesaid problems of the conventional fiber optic connectors, it is an object of the present invention to provide a fiber optic connector which allows its transmitter- and receiver-side members to be connected easily, and is capable of blocking a light beam reliably against emission from the transmitter-side member when the transmitter- and receiver-side members are separated from each other.

According to the present invention, there is provided a fiber optic connector comprising a plug having a ferrule adapted to be connected to a tip end of an optical fiber, a receptacle associated with a light-emitting element and having a ferrule insertion hole defined therein for receiving the ferrule therein, the ferrule insertion hole being held in light-transmitting communication with the light-emitting element, the receptacle being arranged such that the receptacle establishes an optical path between the light-emitting element and the optical fiber for optical coupling therebetween when the ferrule is inserted into the ferrule insertion hole, and blocking means for interrupting the optical path within the ferrule insertion hole in response to removal of the ferrule from the ferrule insertion hole.

The blocking means comprises a resilient member disposed in the ferrule insertion hole and resiliently displaceable into an inner circumferential surface of the ferrule insertion hole when pressed by the ferrule, thereby allowing the ferrule to be inserted into the ferrule insertion hole.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
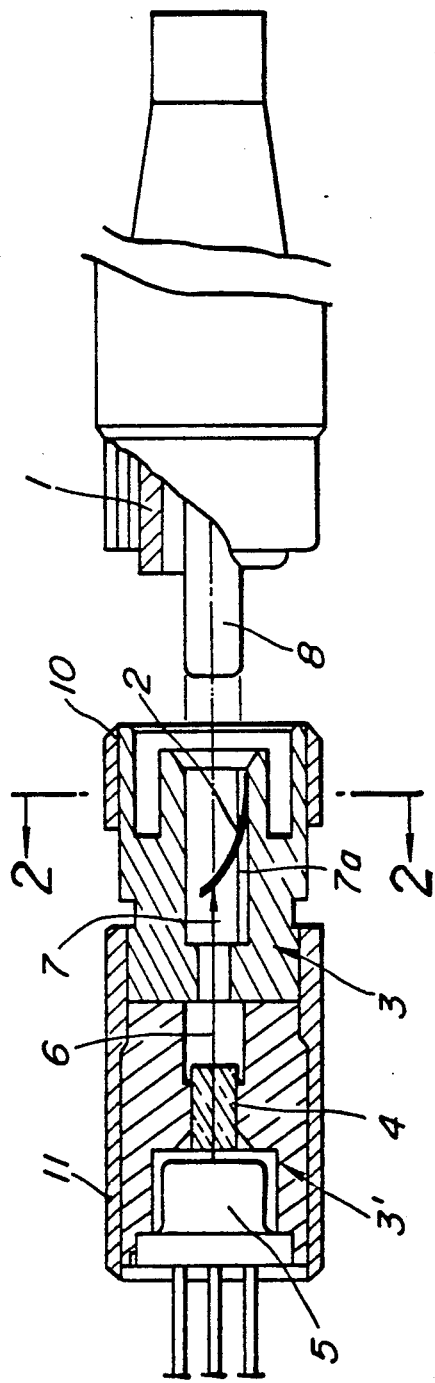
FIG. 1 is an axial cross-sectional view of a fiber optic connector according to a first embodiment of the present invention.

FIG. 1 shows a fiber optic connector according to a first embodiment of the present invention.

As shown in FIG. 1, the fiber optic connector essentially comprises a plug 1 to which an optical fiber (not shown) is connected, and a socket or receptacle 3 to which the plug 1 can be removably connected. The fiberoptic connector includes an elongate ferrule 8 projecting axially from the plug 1 toward the receptacle 3. The optical fiber has a tip end held within the ferrule 8. To the receptacle 3, there is fixed a case 3' which encases a laser diode 5 and a lens 4 such as a graded-index rod lens for concentrating and applying a laser beam from the laser diode 5 to the optical fiber. The receptacle 3 is joined to a laser beam output end of the case 3'. The case 3', the laser diode 5, and the lens 4 jointly constitute a laser diode module.

Figure 2:
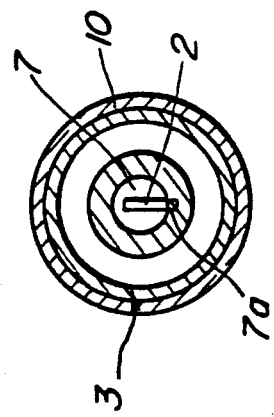
FIG. 2 is a cross-sectional view taken along line 2—2 of FIG. 1.

The receptacle 3 has a ferrule insertion hole 7 defined centrally therein and extending axially from a distal end thereof. The ferrule insertion hole 7 is positioned coaxially with an optical path 6 for the laser beam emitted from the laser diode 5 through the lens 4. The ferrule insertion hole 7 serves to receive the ferrule 8 removably fitted therein. As shown in FIG. 2, the ferrule insertion hole 7 is defined by a cylindrical wall surface which has a shallow axial slit 7a defined in a bottom portion thereof and extending axially from an inlet end of the ferrule insertion hole 7.

A leaf spring 2 has one end fixed to the inlet end of the slit 7a. When the plug 1 is removed from the receptacle 3, i.e., when the ferrule 8 is withdrawn out of the ferrule insertion hole 7, the leaf spring 2 is resiliently curved arcuately radially inwardly in the ferrule insertion hole 7 in an axial direction inwardly into the ferrule insertion hole 7 from the inlet end of the ferrule insertion hole 7, thereby blocking or interrupting the optical path 6. The leaf spring 2 is in the form of a long slender strip which has a width substantially equal to or larger than the width of the optical path 6.

The leaf spring 2 is made of a light-impermeable material which may be a metal or engineering plastic material having a suitable degree of resiliency. The end of the leaf spring 2 is bonded to the inlet end of the slit 7a if the leaf spring 2 is made of an engineering plastic, or spot-welded to the inlet end of the slit 7a if the leaf spring 2 is made of a metal. Thus, the leaf spring 2 is supported in a cantilevered fashion on the inner circumferential surface of the ferrule insertion hole 7.

The receptacle 3 and the case 3' are surrounded by sheaths 10, 11, respectively.

Figure 3:
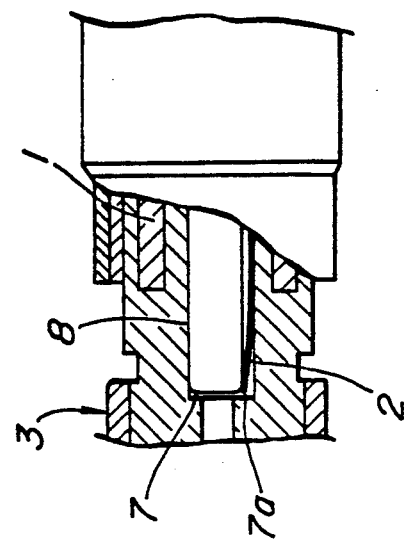
FIG. 3 is a fragmentary cross-sectional view of the fiber optic connector shown in FIG. 1, showing a receptacle and a plug which are connected to each other.

When the plug 1 is separated from the receptacle 3, i.e., when the ferrule 8 is removed from the receptacle insertion hole 7, the leaf spring 2 which has been pressed between the inner circumferential surface of the ferrule insertion hole 7 and the outer circumferential surface of the ferrule 8, springs up radially inwardly into the ferrule insertion hole 7, thereby interrupting or blocking the optical path 6 between the receptacle 3 and the plug 1. When the plug 1 is inserted into the receptacle 3, the ferrule 8 is fitted into the ferrule insertion hole 7. Now, as shown in FIG. 3, the leaf spring 2 is pressed down against the inner circumferential surface of the ferrule insertion hole 7 by the outer circumferential surface of the ferrule 8, and extends axially in the ferrule insertion hole 7. The leaf spring 8 is completely displaced into the slit 7a out of the optical path 6 between the receptacle 3 and the plug 1 for thereby allowing the laser beam from the laser diode 5 to be applied through the optical path 6 to the optical fiber connected to the ferrule 8.

Figure 4:
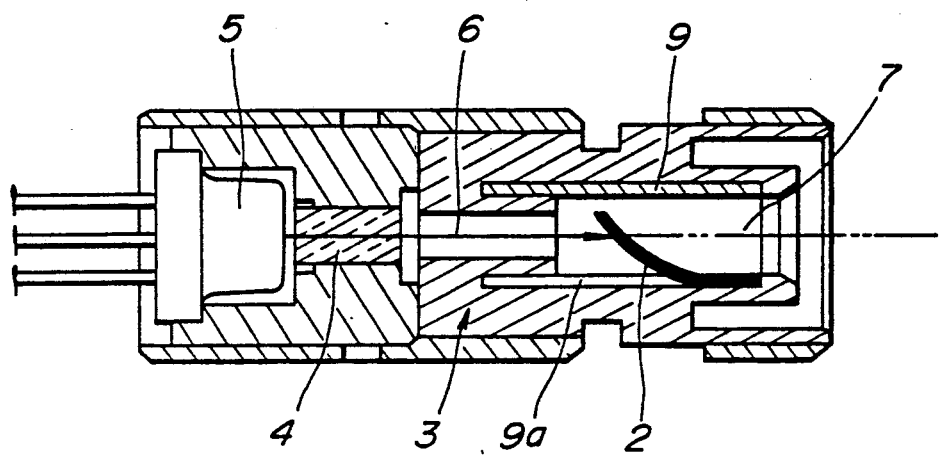
FIG. 4 is a cross-sectional view of a fiber optic connector according to a second embodiment of the present invention, the view showing only a receptacle which would cooperate with a plug as shown in FIG. 1.
Figure 5:
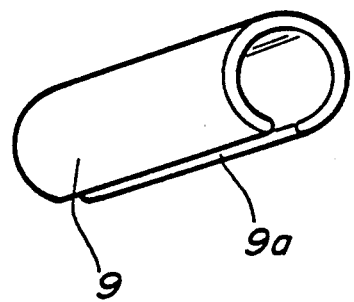
FIG. 5 is a perspective view of a split sleeve used in the fiber optic connector shown in FIG. 4.

FIG. 4 shows a fiber optic connector according to a second embodiment of the present invention. The fiber optic connector shown in FIG. 4 employs a split sleeve 9 (see FIG. 5) which is disposed in the receptacle 3 and has an inner circumferential surface that defines the ferrule insertion hole 7 therein. The split sleeve 9 has a slit 9a defined axially therein and extending the full length thereof, for receiving the leaf spring 2 when it is pressed down against the inner circumferential surface of the split sleeve 9 by the ferrule 8. Since the split sleeve 9 has the slit 9a itself, it is not necessary to define a slit, like the slit 7a in the first embodiment, in the receptacle 3. The other structural details of the fiber optic connector shown in FIG. 4 are the same as those of the fiber optic connector shown in FIG. 1.

The present invention has been described as being incorporated in the fiber optic connector for connecting the laser diode module including the lens 4 and the laser diode 5 to the optical fiber. However, the principles of the present invention are also applicable to a fiber optic connector in which the lens 4 is dispensed with and a laser beam is directly introduced into the ferrule insertion hole 7, or a fiber optic connector in which a laser beam emitted from a carbon dioxide gas laser is introduced into the ferrule insertion hole 7. The fiber optic connector according to the present invention may be a threaded-coupling FC type fiber optic connector, a push pull-coupling SC type fiber optic connector or ST type fiber optic connector. Instead of connecting the laser diode 5 or any of various other light-emitting elements to the receptacle 3, an optical fiber for transmitting a light beam may be connected to the receptacle 3.

With the present invention, as described above, when the plug 1 is removed from the receptacle 3, the resilient leaf spring 2 automatically jumps under its own resiliency into the optical path 6 to block or interrupt the laser beam traveling axially through the ferrule insertion hole 7. Therefore, even if the fiber optic connector is handled while the laser diode 5 remains energized for stable laser beam output, the laser beam is prevented from being emitted out of the ferrule insertion hole 7 when the plug 1 is removed from the receptacle 3. Therefore, the fiber optic connector is safe since the laser beam can not directly enter the operator's eye even upon removal of the plug 1 from the receptacle 3. Since the fiber optic connector is relatively simple in construction, the laser diode module associated with the fiber optic connector can be manufactured inexpensively. Unless the leaf spring 2 loses its resiliency, the optical path 6 is blocked or interrupted by the leaf spring 2 upon removal of the plug 1 even after the plug 1 is repeatedly detached and attached. Accordingly, the fiber optic connector can repeatedly be used many times.

In addition, when the plug 1 is connected to or inserted in the receptacle 3, the plug 1 and the receptacle 3 are firmly held in interfitting engagement with each other under the bias of the leaf spring 2. This firm interfitting engagement prevents the plug 1 from being easily pulled out of the receptacle 3, and also permits the ferrule 8 to be centered within the ferrule insertion hole 7 when the ferrule insertion hole 7 is of a rectangular cross section and the ferrule 8 is of a complementary rectangular cross section. Moreover, even if external forces are applied to the fiber optic connector or the fiber optic connector changes its posture, the optical axes of the transmitter- and receiver-side components of the fiber optic connector, e.g., the lens 4 and the ferrule 8, remain aligned highly accurately without displacement due to the firm resiliently biased engagement between the plug 1 and the receptacle 3. Consequently, the fiber optic connector allows stable and reliable optical data transmission therethrough.

Since the leaf spring 2 is received within either the slit 7a defined in the inner circumferential surface of the ferrule insertion hole 7 or the slit 9a in the split sleeve 9 when the ferrule 8 is inserted into the ferrule insertion hole 7, the plug 1 can smoothly be inserted or fitted into the receptacle 3 without being caught by the leaf spring 2.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

I claim:

1. A fiber optic connector comprising:
    a plug having a ferrule adapted to be connected to a tip end of an optical fiber;
    a receptacle associated with a light-emitting element and having a ferrule insertion hole defined therein for receiving said ferrule therein, said ferrule insertion hole being held in light-transmitting communication with said light-emitting element, said receptacle being arranged such that the receptacle establishes an optical path between said light-emitting element and the optical fiber for optical coupling therebetween when said ferrule is inserted into said ferrule insertion hole; and
    blocking means for interrupting said optical path within said ferrule insertion hole in response to removal of said ferrule from said ferrule insertion hole for thereby preventing light emitted from said light-emitting element from being emitted out of said ferrule insertion hole.

2. A fiber optic connector according to claim 1, wherein said blocking means comprises a resilient member disposed in said ferrule insertion hole and resiliently displaceable into an inner circumferential surface of said ferrule insertion hole when pressed by said ferrule, thereby allowing said ferrule to be inserted into said ferrule insertion hole.

3. A fiber optic connector according to claim 2, wherein said resilient member is supported in a cantilevered fashion in the inner circumferential surface of said ferrule insertion hole, said resilient member being impermeable to light, and resiliently movable to interrupt said optical path in response to removal of said ferrule from said ferrule insertion hole.

4. A fiber optic connector according to claim 3, wherein said inner circumferential surface of the ferrule insertion hole has an axially extending slit defined therein, said resilient member comprising a long slender strip having a width substantially equal to the width of said optical path, said resilient member having one end fixedly disposed in said slit and curved radially inwardly into said ferrule insertion hole toward the opposite end of the resilient member, said resilient member being resiliently displaceable into said slit when pressed by said ferrule in response to insertion of said ferrule into said ferrule insertion hole.

5. A fiber optic connector according to claim 3, further including a split sleeve disposed in said receptacle, said ferrule insertion hole being defined in said split sleeve, said slit being defined axially in said split sleeve, said resilient member being resiliently displaceable into said slit when pressed by said ferrule in response to insertion of said ferrule into said split sleeve.

6. A fiber optic connector according to claim 3, wherein said resilient member comprises a metal leaf spring.

7. A fiber optic connector according to claim 4, wherein said resilient member comprises a leaf spring formed of an engineering plastic material.

8. A fiber optic connector according to claim 1, wherein said ferrule insertion hole comprises a hole having a polygonal cross section, said ferrule comprising an elongate element having a polygonal cross section, said ferrule being insertable complementarily into said ferrule insertion hole.

9. A fiber optic connector comprising:
a ferrule adapted to be connected to a tip end of an optical fiber;
a laser diode module having laser output means for emitting a concentrated laser beam;
a receptacle coupled to an output end of said laser diode module and having a ferrule insertion hole defined by an inner circumferential surface thereof for receiving said ferrule therein, said ferrule insertion hole being held coaxially with the laser beam emitted from said laser output means for optical coupling between the optical fiber and said laser diode module; and
a leaf spring disposed in said ferrule insertion hole, said leaf spring being normally curved arcuately radially inwardly in said hole away from said inner circumferential surface to interrupt the laser beam emitted from said laser output means, said leaf spring being resiliently displaceable into said inner circumferential surface in response to insertion of said ferrule into said ferrule insertion hole, thereby allowing said ferrule to be inserted into said ferrule insertion hole.

10. A fiber optic connector comprising:
receptacle means for being secured to a light emitting element;
plug means for being secured to a tip end of an optical fiber and for being selectively coupled to said receptacle means;
said receptacle means establishing an optical path between said light emitting element and said optical fiber when said plug means is coupled thereto; and
means for blocking said optical path within said receptacle means in response to removal of said plug means from coupling engagement with said receptacle means such that light emitted by said light emitting element is prevented from being emitted out said receptacle means.

11. A fiber optic connector according to claim 10, wherein said plug means includes a ferrule adapted to be connected to said tip end of said optical fiber, and said receptacle means having a ferrule insertion hole defined therein for securely receiving said ferrule therein when said plug means is coupled to said receptacle means.

12. A fiber optic connector according to claim 11, wherein said blocking means comprises a resilient member disposed in said ferrule insertion hole and resiliently displaceable into an inner circumferential surface of said receptacle means defining said ferrule insertion hole when pressed by said ferrule, thereby allowing said ferrule to be inserted into said ferrule insertion hole.

* * * * *

UNITED STATES PATENT AND TRADEMARK OFFICE
CERTIFICATE OF CORRECTION

PATENT NO. : 5,104,242
DATED : April 14, 1992
INVENTOR(S) : Masatake Ishikawa It is certified that error appears in the above-identified patent and that said Letters Patent is hereby corrected as shown below:

ON THE TITLE PAGE
In the Abstract    line 5, change "plug" to --ferrule--;
line 13, change "insertion" to --removal--;
line 14, change "into" to --from--.

Column 1, line 35, change "Also if" to --Also, if--.

Column 3, line 57, change "push pull-coupling" to --push-pull-coupling--.

Column 6, line 36, change "out said" to --out of said--.

Signed and Sealed this

Eighth Day of June, 1993

Attest:

MICHAEL K. KIRK

Attesting Officer     Acting Commissioner of Patents and Trademarks